United States Patent Office 3,497,677
Patented Feb. 24, 1970

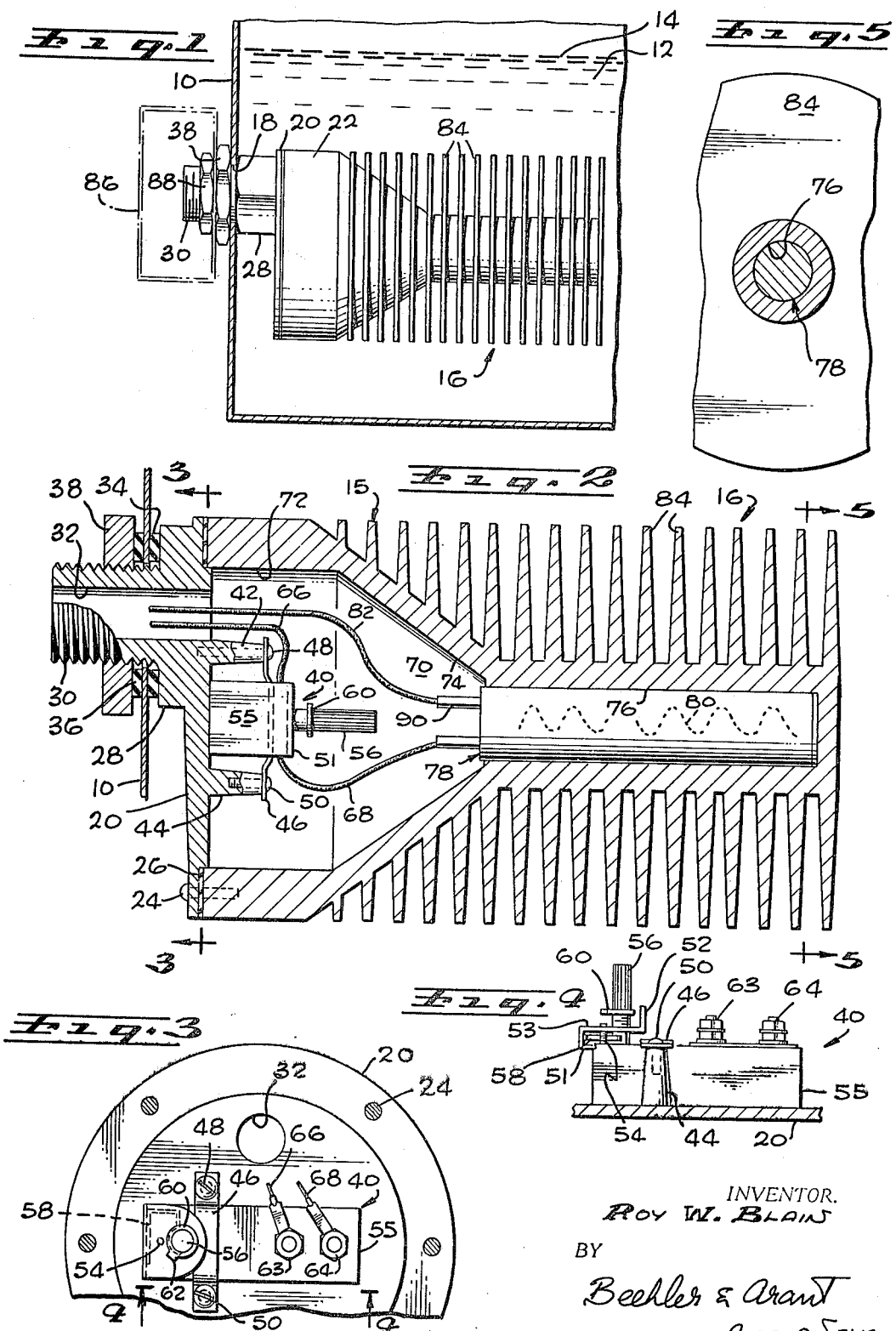

3,497,677
ELECTRIC HEATER UNIT FOR
LIQUID RESERVOIRS
Roy W. Blain, La Crescenta, Calif., assignor to Elevator Equipment Co., Los Angeles, Calif., a corporation of California
Filed Mar. 4, 1968, Ser. No. 710,129
Int. Cl. H05b 3/06
U.S. Cl. 219—523                           9 Claims

ABSTRACT OF THE DISCLOSURE

A heater unit for regulating the temperature of a fluid in a reservoir. The unit includes a shell having a chamber formed therein with a heating element mounted in a first end of the chamber. A cover plate extends over an opening in a second end of the chamber, and the cover plate is fastened to the shell with a thermal insulating gasket disposed therebetween. A thermostat is mounted on an inner surface of the cover plate and is electrically coupled to the heating element for controlling the element as a function of the temperature sensed by the thermostat. The outer surface of the shell includes a plurality of finned surfaces for maximizing the heat dissipation efficiency of the unit. The thermostat responds to both the temperature of the fluid and to the temperature of the shell so as to maintain the fluid in the reservoir within a desired temperature range, while safeguarding against over heating of the fluid in direct contact with the shell.

BACKGROUND OF THE INVENTION

This invention relates generally to heater units for liquid reservoirs, and in particular to self contained heater units for maintaining the temperature of the liquid within a selected range while insuring that the temperature of the unit does not exceed safe operating limits.

Heretofore the standard methods of regulating the temperature of a fluid in a reservoir have all included physically separated heating and sensing elements. The heating element, in accordance with the standard methods, is controlled by a sensing device, such as a thermostat, which responds only to the temperature of the fluid in contact therewith. The thermostat switches the heating element on and off as necessary to maintain the liquid in contact with the thermostat at a selected temperature. In these prior art systems, since the thermostat senses only the temperature of the fluid adjacent thereto, it is possible that the heating element may become excessively hot and cause deterioration of the fluid in contact with the surfaces of the element. The just described problem is particularly acute in applications involving hydraulic oil, where the deterioration of the oil causes the formation of carbon particles on the surfaces of the heating element, which said particles in turn reduce the heat dissipating efficiency of the surfaces. This decreases in the heat conducticity of the surfaces results in an increase in the temperature thereof, causing formation of more particles and thereby initiating a run away deterioration cycle resulting in the destruction of the heating element. Another problem encountered in prior art temperature control systems employing separate heating and sensing elements is that the heating element may be destroyed by excessive temperatures if the fluid is inadvertently removed from the reservoir while the temperature control system is activated. Therefore a heater unit which maintains the temperature of a liquid in a reservoir within a selected range while insuring that the surfaces of the unit will not exceed safe operating temperatures will be a significant contribution to the art.

SUMMARY OF THE INVENTION

Briefly the heater unit in accordance with the principles of the subject invention comprises a heat dissipating shell having a chamber formed therein and a plurality of heat dissipating fins attached to the outer surface thereof. A first end of the chamber is adapted to contain a heating element and the heating element is so located relative to the fins as to optimize the transfer of heat from the shell to the fluid adjacent thereto. The finned structure of the outer surface of the shell increases the surface area in contact with the fluid and therefore the heating efficiency of the unit. A cover plate extends over an opening formed in a second end of the chamber and the cover is attached to the shell with a thermal insulating gasket therebetween. A thermostat is mounted on an interior surface of the cover plate and is electrically coupled to the heating element. The cover plate includes a hollow threaded stud member for mounting the heater unit through a wall of the reservoir and for coupling electrical power to the thermostat.

Since the heating element and the thermostat are enclosed in a single unit, the thermostat is responsive to both the temperature of the fluid outside the unit as well as to the temperature of the surfaces of the heat dissipating shell. Therefore no excess heating of the fluid in contact with the shell can occur, as the thermostat will prevent the heating element from over heating the shell. The gasket provides a selected degree of thermal insulation between the shell and the cover plate such that the thermostat is not over responsive to the temperature of the shell. Due to the insulating effect of the gasket, the cycling of the heating element is maintained at the lowest possible rate consistent with the objective of insuring that the surface of the shell does not exceed safe operating temperatures.

It is therefore among the objects of the subject invention to provide a new and improved heater unit for liquid reservoirs which prevents the over heating and deterioration of the fluid in contact with the surfaces of the heater.

Another object of the invention is to provide a new and improved heater unit for liquid reservoirs which safeguards against the self destruction of the heating element in the event that the unit is inadvertently actuated while the fluid is absent from the reservoir.

Another object of the invention is to provide a new and compact heater unit having a novel configuration of finned surfaces so as to maximize the heat dissipation surface area.

A further object of the invention is to provide a new and improved self contained heater unit which is capable of efficiently controlling the temperature of a fluid in a reservoir while preventing over heating of the fluid in direct contact with the surfaces thereof.

Still another object in the invention is to provide a new and improved heater unit which is relatively inexpensive and which is contained in a single compact unit that may be easily mounted in a liquid reservoir for controlling the temperature of the liquid contained therein.

BRIEF DESCRIPTION OF THE DRAWINGS

The objects and advantages of the subject invention will be more fully apparent from the following description considered in conjunction with the accompanying drawings, in which:

FIGURE 1 is a partially cut away side elevational view of a heater unit, in accordance with the invention, mounted to a liquid reservoir.

FIGURE 2 is a fragmentary cross-sectional view taken on the line 2—2 of FIGURE 1.

FIGURE 3 is a fragmentary cross-sectional view taken on the line 3—3 of FIGURE 2.

FIGURE 4 is a fragmentary cross-sectional view taken on the line 4—4 of FIGURE 3.

FIGURE 5 is a cross-sectional view taken on the line 5—5 of FIGURE 2.

DESCRIPTION OF THE PREFERRED EMBODIMENT

In the embodiment of the invention, which has been chosen by ay of illustration, there is shown a reservoir or tank 10 which contains a fluid 12 having a level 14. A heater unit in accordance with the principles of the subject invention, indicated generally by the reference character 16, includes a housing 15 which is mounted through a hole 18 preferably near the bottom of the reservoir 10. The housing 15, which for example may be constructed from aluminum die cast material, has a cover plate 20 and a shell 22, which are attached by means of fastening bolts 24. Between the cover plate 20 and the shell 22 is a gasket or seal 26 which provides a fluid tight closure as well as a degree of thermal insulation. A protruding stud member 28 is formed on the cover plate 20, and the stud has a threaded end 30 and a passage 32 extending axially therethrough. A gasket 34 is located between the stud 28 and an inner surface of the reservoir 10, and a second gasket 36 is located between a fastening nut 38 and the outer surface of the reservoir. The heater unit 16 is secured to the reservoir 10 by the fastening nut 38 and the gaskets 34 and 36, which may be soft copper gaskets for example. The gaskets 34 and 36 provide a fluid seal as well as thermal insulation between the reservoir and the heater unit.

A thermostat unit 40 is mounted between a pair of mounting posts 42 and 44 on the inside surface of the cover plate 20. A strap 46 which is attached to the posts 42 and 44 by bolts 48 and 50 respectively, firmly holds the thermostat unit 40 against the cover plate 20. As seen best in FIGURE 4, the thermostat 40 has a top plate 51 which is turned up on the left end thereof to form a U-shaped structure 53, which structure carries an upwardly directed vertical post 52. A set screw 54 is threaded through the upper surface of the U-shaped structure 53 against the lower surface thereof to add structural rigidity thereto. An adjustment stud 56 is threaded through the U-shaped structure 53 into the case 55 of the thermostat unit 40 wherein it controls a conventional thermal control mechanism (not shown). The control mechanism may include a set of contact element and a bi-metallic member (not shown) so attached that the contacts open and close in response to the temperature of the case 55, and to the tension applied from the adjustment stud 56. A spring 58 is mounted between the left end of the U-shaped structure 53 and the adjustment stud 56 so as to maintain the stud in the last adjusted position. A washer 60, having an extension 62 formed thereon, is mounted on the stud 56. The extension 62 is adapted to engage the vertical post 52 so as to limit the adjustment range of the stud 56. The thermostat 40 further comprises a pair of electric terminals 63 and 64 which are coupled to leads 66 and 68 respectively.

The shell 22 has a chamber 70 formed therein, and the chamber 70 consists of a cylindrical section 72, a truncated conical section 74 and a second cylindrical section 76. The inner surface of the cover plate 20, and the case 55 extend into the section 72 of the chamber 70, and a heating element 78 is mounted in the second cylindrical section 76. The heating element 78 includes a heating member 80 electrically coupled in series between a pair of leads 68 and 82. The outer surface of the shell 22 which encompasses the sections 74 and 76 of the chamber 70 has a plurality of heat dissipating fins 84 formed thereon. The function of the fins 84 is to maximize the surface area in contact with the fluid, thereby increasing the heating efficiency of the heater unit 16. As a typical example, a plurality of fins are spaced longitudinally along the circumference of the shell 22 as shown. It will be appreciated by those skilled in the art that in accordance with the invention the number of fins may be increased or decreased, and the orientation changed to obtain a desired degree of heat dissipation efficiency.

An electrical junction box 86 is mounted on the threaded end 20 of the stud 28 by a fastening nut 88. The leads 66 and 82 are connected to a source of electrical power through terminals (not shown) contained in the junction box 86.

In the operation of the heater unit 16 in accordance with the principles of the invention, electrical power is coupled on the leads 82 and 66 to a first terminal 90 of the heating element 78 and to the terminal 63 of the thermostat 40, respectively. The thermostat 40 responds to the temperature of the fluid in contact with the cover plate 20 as well as to the temperature of the shell to control the heating element 78. The gasket 26, disposed between the cover plate 20 and the shell 22, functions not only as a fluid seal, but also as a thermal insulator so that the thermostat 40 is not over responsive to the temperature of the shell 20. Depending upon the material and thickness selected for the gasket 26, the effect of the temperature of the shell 22 can be offset a desired number of degrees from that of the fluid. For example, if the thermostat adjustment stud 56 is set so that the heating element will be switched off when the temperature of the fluid 12 adjacent to the cover plate 20 reaches X degrees, then the thickness of the gasket 26 may be so selected that the heating element will also be switched off if the surface temperature of the shell reaches X plus Y degrees. Further by way of illustration, if the contacts of the thermostat 40 are open (no electrical connection between the leads 66 and 68) and the temperature at the thermostat drops below a selected temperature $X-1$, then the thermostat 40 causes the heating element 78 to be activated. Again the temperature change sensed by the thermostat is a combined result of the temperature of the fluid and the shell, but with differing scale factors due to the gasket 26. The heat generated by the heating element 78 is conducted to the plurality of fins 84 and therefrom to the fluid 12, which is in contact with the surfaces of the shell 22. It should be noted that the novel configuration of the finned surfaces of the heater 16 increases the heating surface area and therefore the heating efficiency. The heat generated by the element 78 is conducted through the fluid in contact with the shell to the remaining liquid in the reservoir until the circuit to the heating element 78 is opened in response to the thermostat 40. As mentioned previously, the thermostat 40 will switch the element 78 off when the fluid adjacent to the cover plate 20 reaches a desired temperature X or when the shell 22 reaches a maximum safe operating temperature, for example, X plus Y degrees.

In accordance with the principles of the subject invention, the thermostat 40 is responsive to both the temperature of the fluid 12 adjacent to the unit, as well as to the temperature of the surfaces of the shell 22. Therefore no excessive heating of the shell or deterioration of the fluid in contact with the shell can occur since the thermal coupling between the shell and the thermostat 40 (through the gasket 26) prevents the surfaces of the shell from becoming over heated. Further the gasket 26 prevents the thermostat 40 from being over responsive to the temperature of the shell 22 thereby eliminating excessive cycling of the thermostat.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An apparatus comprising:
   a heat dissipating shell having a chamber formed therein, a first end of said chamber being open and an enclosure formed at a second end of said chamber;
   a heat conductive cover plate mounted to said shell and providing a liquid tight cover for said opening;
   a gasket having predetermined thermal insulation properties disposed between and in contact with said cover plate and said shell at said first open end;
   an electrically actuated heating element mounted in said enclosure at said second end of said chamber;
   a thermostat device for controlling said heating element, said thermostat device being mounted in said chamber spaced from said shell and from said heating element, said thermostat device being positioned so that it is responsive only to the temperature of said cover plate; said thermostat device being operatively, electrically coupled to said heating element; and
   means for supplying electrical power to said heating element through said thermostat device.

2. The apparatus of claim 1 wherein said shell includes a plurality of finned shaped members formed on the outer surface of said enclosure.

3. The apparatus of claim 1 wherein said enclosure is shaped to conform to the outer contours of said heating element, with heat dissipating fins being substantially symmetrically located about the outer surfaces of the said enclosure.

4. The apparatus of claim 1 wherein said shell has a plurality of heat dissipating fins formed on the outer surfaces thereof.

5. The apparatus of claim 1 wherein said chamber has first and second cylindrically shaped sections with a truncated conically shaped section formed therebetween; and wherein said heating element is conically shaped and adapted for mounting in said first cylindrically shaped section.

6. The apparatus of claim 1 with said shell having a plurality of heat dissipating fins formed on the outer surface thereof; and fins extending along the outer surfaces of said first and conical sections of said chamber, such that the periphery of said fins define a slotted cylindrical configuration.

7. The apparatus of claim 1 wherein said cover includes a threaded stud member having an axial port formed therethrough.

8. The apparatus of claim 1 including means for mounting said apparatus to a liquid reservoir below the normal level of the liquid in said reservoir.

9. An apparatus for regulating the temperature of a liquid in a reservoir, said apparatus comprising:
   a heat dissipating metallic shell having a chamber formed therein, with an opening at a first end of said chamber and an enclosure formed at a second end of said chamber;
   an electrical heating element having an outer surface contour adapted for mounting in said enclosure;
   a heat conductive cover plate adapted for mounting to said shell and extending over said opening;
   a sealable port extending from the exterior of said apparatus and opening into said chamber;
   a thermally insulating gasket disposed in sealing relationship between said cover and said shell;
   a thermostat device mounted on the inner surface of said cover at a location remote from said heating element and said shell, said thermostat device being responsive only to the temperature of said cover plate, said thermostat device being electrically coupled to said heating element to control said heating element; and
   electrical lead means extending through said port into said chamber, said lead means being operatively coupled to said heating element and said thermostat device.

References Cited
UNITED STATES PATENTS

| | | | |
|---|---|---|---|
| 1,881,881 | 10/1932 | Noble | 338—218 X |
| 2,569,250 | 9/1951 | Mims | 219—530 X |
| 2,735,922 | 2/1956 | Johnson | 219—530 |
| 2,789,201 | 4/1957 | Sherwin | 219—523 |
| 3,085,145 | 4/1963 | Wray | 219—276 X |
| 3,111,574 | 11/1963 | Spini | 219—381 X |
| 3,166,666 | 1/1965 | Williams | 219—381 X |
| 3,272,965 | 9/1966 | Reichelt | 219—540 X |
| 3,277,277 | 10/1966 | Wells | 219—523 X |
| 3,371,188 | 2/1968 | Henes et al. | 219—381 X |
| 3,399,295 | 8/1968 | Chaustowich | 219—523 |

VOLODYMYR Y. MAYEWSKY, Primary Examiner

U.S. Cl. X.R.

165—185; 219—381, 437, 530, 540